(12) United States Patent
Kudo et al.

(10) Patent No.: US 8,928,282 B2
(45) Date of Patent: Jan. 6, 2015

(54) CONTROL SYSTEM FOR ASSEMBLED BATTERY

(75) Inventors: Akihiko Kudo, Hitachinaka (JP); Kenji Nakai, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 825 days.

(21) Appl. No.: 13/094,303

(22) Filed: Apr. 26, 2011

(65) Prior Publication Data

US 2011/0260687 A1    Oct. 27, 2011

(30) Foreign Application Priority Data

Apr. 27, 2010   (JP) ................................ 2010-102609

(51) Int. Cl.
| | |
|---|---|
| H02J 7/00 | (2006.01) |
| H01M 10/42 | (2006.01) |
| H01M 10/44 | (2006.01) |
| H01M 10/48 | (2006.01) |

(52) U.S. Cl.
CPC ........... *H02J 7/0016* (2013.01); *H01M 10/425* (2013.01); *H01M 10/441* (2013.01); *H01M 10/482* (2013.01); *H01M 2010/4271* (2013.01); *H01M 2220/20* (2013.01); *Y02T 10/7055* (2013.01)
USPC .......................................... 320/118; 320/122

(58) Field of Classification Search
USPC .................................................. 320/116–122
See application file for complete search history.

(56) References Cited

U.S. PATENT DOCUMENTS

| | | | | |
|---|---|---|---|---|
| 6,160,379 | A  * | 12/2000 | Chalasani et al. ............. | 320/119 |
| 7,405,537 | B2 * | 7/2008 | Hoffman et al. ............... | 320/132 |
| 2006/0046104 | A1 * | 3/2006 | Zimmerman ..................... | 429/7 |
| 2008/0258683 | A1 * | 10/2008 | Chang ........................... | 320/112 |
| 2009/0021222 | A1 * | 1/2009 | Kudo et al. .................... | 320/160 |

FOREIGN PATENT DOCUMENTS

| | | |
|---|---|---|
| JP | 2005-318750 A | 11/2005 |
| JP | 2007-18871 A | 1/2007 |
| JP | 3991620 B2 | 10/2007 |

* cited by examiner

*Primary Examiner* — Drew A Dunn
*Assistant Examiner* — Robert Grant
(74) *Attorney, Agent, or Firm* — Crowell & Moring LLP

(57) ABSTRACT

The present invention is a control system for an assembled battery that controls an assembled battery comprising a plurality of cells, including: a bypass circuit connected in parallel to each cell of the cells, and comprising a switching element and a resistor connected in series; and a control circuit that controls a bypass current flowing in the bypass circuit by opening and closing the switching element, in order to discharge the cell; wherein the bypass circuit is set so that a current of a same magnitude as a self-discharge current in a predetermined overcharged states of the cell flow in the bypass circuit.

7 Claims, 9 Drawing Sheets

CONTROL SYSTEM FOR ASSEMBLED BATTERY

INCORPORATION BY REFERENCE

The disclosure of the following priority application is herein incorporated by reference: Japanese Patent Application No. 2010-102609, filed Apr. 27, 2010.

BACKGROUND OF THE INVENTION

1. Field of the Invention

The present invention relates to a control system for an assembled battery.

2. Description of the Related Art

For a battery (an assembled battery) that consists of a plurality of cell groups connected together, each of these cell groups including a plurality of cells (unit cells) connected in series, a control system is per se known that is provided with a cell controller that monitors the states of the cells in each of the cell groups (for example, refer to Japanese Laid-Open Patent Publication 2005-318750). In this type of assembled battery control system, a bypass current flow circuit is provided that reduces differences in SOC (State Of Charge) between the cells that may arise during charging or discharging or due to neglect by flowing a bypass current in those cells whose SOCs are high, and that measures the no-load voltages and flows bypass current in those cells whose no-load voltages are high, thereby performing control so as to make the SOCs of all of the cells uniform.

However since, with the prior art control system for an assembled battery described above, in order to enhance the reliability, the detection circuit that detects the voltages of the cells is typically provided as a double system, i.e. is duplicated, accordingly the system becomes complicated due to increase in the number of components, and there is the problem of high cost.

SUMMARY OF THE INVENTION

According to the 1st aspect of the present invention, a control system for an assembled battery that controls an assembled battery comprising a plurality of cells, comprises: a bypass circuit connected in parallel to each cell of the cells, and comprising a switching element and a resistor connected in series; and a control circuit that controls a bypass current flowing in the bypass circuit by opening and closing the switching element, in order to discharge the cell; wherein the bypass circuit is set so that a current of a same magnitude as a self-discharge current in a predetermined overcharged states of the cell flow in the bypass circuit.

According to the 2nd aspect of the present invention, in a control system for an assembled battery according to the 1st aspect, it is preferred that the self-discharge current of the cells is calculated based on a rated capacity of the cell and on a speed of decrease of a SOC of the cell.

According to the 3rd aspect of the present invention, in a control system for an assembled battery according to the 2nd aspect, it is preferred that the self-discharge current of the cell is calculated based on a decrease speed of a SOC at lower SOC than a SOC of the cell in the predetermined overcharged state at which a gas release vent valve of the cell operates.

According to the 4th aspect of the present invention, in a control system for an assembled battery according to the 2nd aspect, it is preferred that the self-discharge current of the cell is calculated based on a decrease speed of a SOC at a SOC that is obtained by subtracting the SOC control width of the assembled battery from a SOC of the predetermined overcharged state at which a gas release vent valve of the cell operates.

According to the 5th aspect of the present invention, in a control system for an assembled battery according to any one of the 1st through 4th aspects, it is preferred that the control circuit performs duty control of the switching element and thereby intermittently flows the bypass current in the bypass circuit, so that control is performed to make an averaged current of the bypass current that flows intermittently in the bypass circuit and the self-discharge current of the cell agree with one another.

According to the 6th aspect of the present invention, a control system for an assembled battery according to the 5th aspect, further comprises a detector that detects a temperature of the assembled battery, and wherein the control circuit adjusts the averaged current flowing intermittently in the bypass circuits according to a temperature detected by the detector.

DESCRIPTION OF THE PREFERRED EMBODIMENTS

An embodiment will now be explained in which the present invention is applied to a lithium ion battery that is mounted to a hybrid automobile. It should be understood that the field of application of the present invention is not limited to a lithium ion battery; it could also be applied to any battery that has the similar characteristics as a lithium ion battery. Moreover, the application of the present invention is not limited to a control system for a battery (an assembled battery) that is mounted to a hybrid automobile; it could also be applied to a control system for a battery of an electric drive system for an electric automobile, for a railway vehicle, for a construction vehicle, or more generally for any industrial device.

Figure 1A:
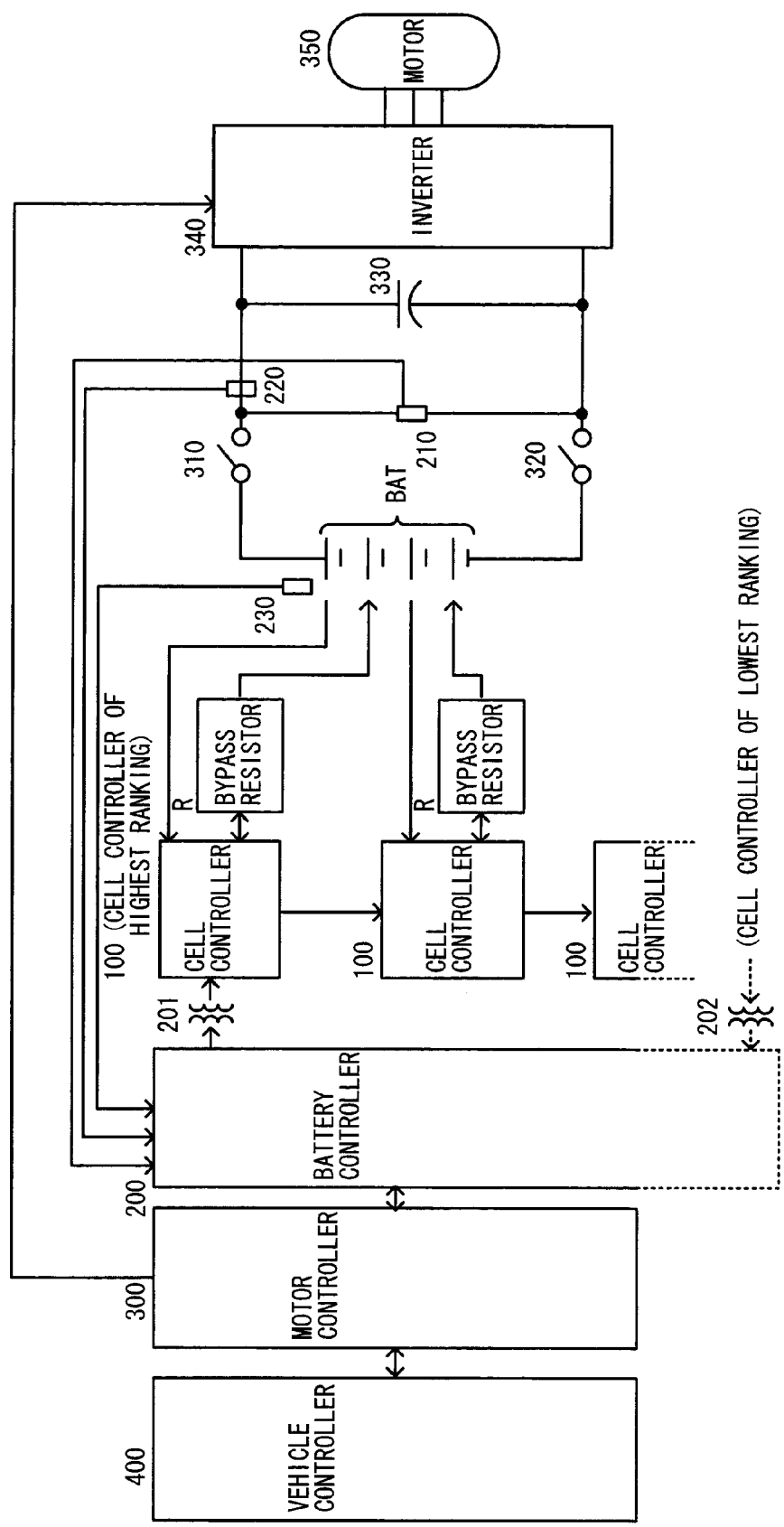
FIG. 1A is a figure showing the overall structure of an electric drive system of a hybrid automobile that includes a control system for an assembled battery according to an embodiment of the present invention.
Figure 1B:
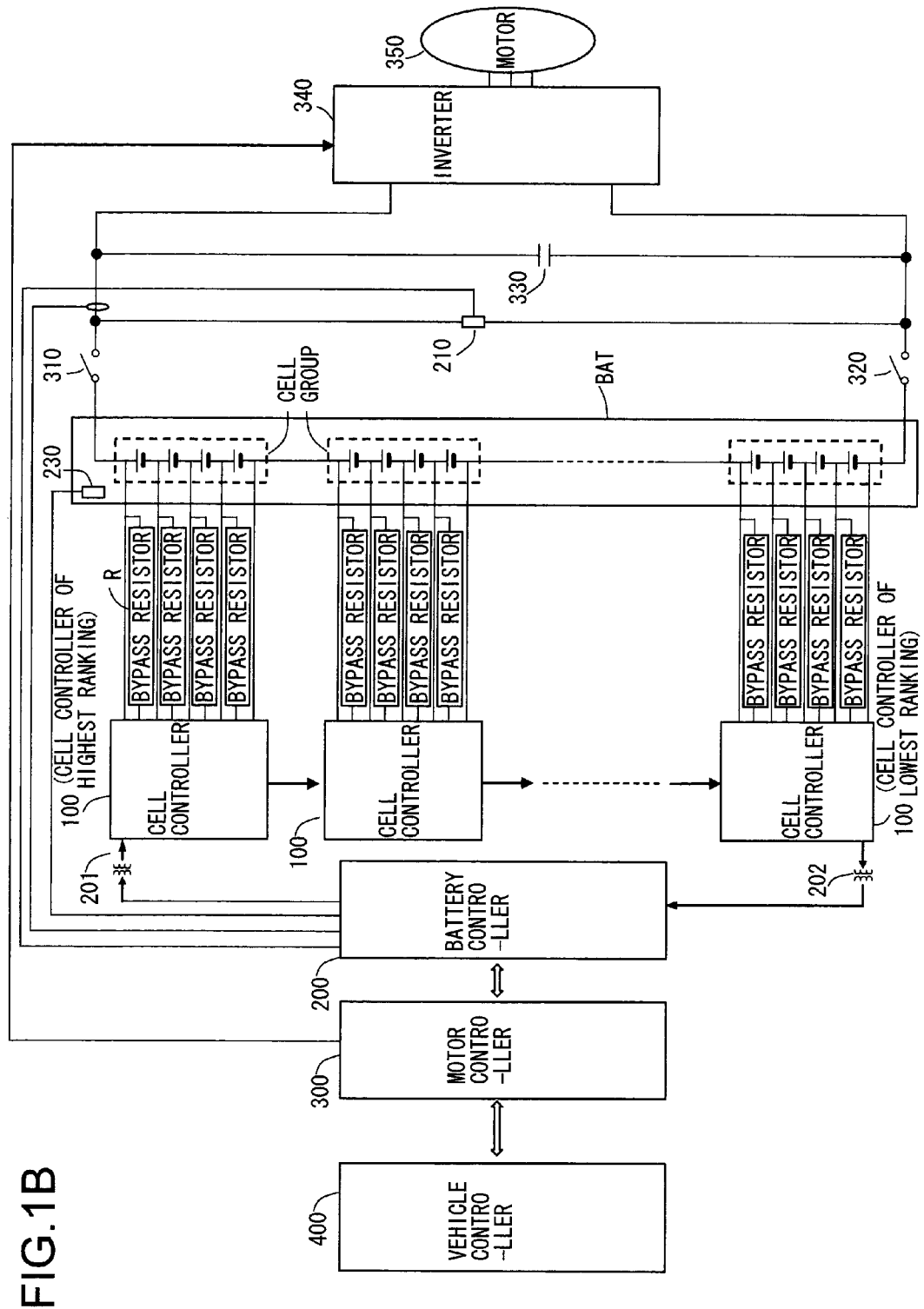
FIG. 1B shows the details of a central portion of FIG. 1A.

FIG. 1A shows the overall structure of an electric drive system of a hybrid automobile that includes a control system for an assembled battery according to an embodiment of the present invention. And FIG. 1B is a figure that shows a central portion of FIG. 1A in detail. This electric drive device for a hybrid automobile includes a vehicle controller 400, a motor controller 300, a battery controller 200, a plurality of cell controllers 100, a battery BAT (an assembled battery), an inverter 340, a motor 350, and so on. Among these, the vehicle controller 400, the motor controller 300, the battery controller 200, the cell controller 100, and the inverter 340 perform mutual transfer of information via a communication circuit that is provided to the vehicle.

A communication circuit is connected between the battery controller 200 and the plurality of cell controllers 100 in the form of a loop, with signals being transmitted from the battery controller 200 to the highest ranking cell controller 100 via a signal isolator 201, and further being transmitted in series order from this highest ranking cell controller 100 through the cell controllers to the lowest ranking cell controller 100, and being finally transmitted from the lowest ranking cell controller 100 to the battery controller 200 via a signal isolator 202. The battery controller 200 thus is capable of performing mutual transfer of information with all of the cell controllers via this loop shaped communication circuit. It should be understood that, while here an example is shown in which transmission of signals is performed via a loop shaped communication circuit, it would also be possible to perform transmission of signals in parallel by connecting communication circuits from the battery controller 200 to all of the cell controllers 100 in parallel.

The vehicle controller 400 controls the running speed and the braking/driving force and so on of the vehicle on the basis of actuation signals from actuation devices that are actuated by the driver of this hybrid automobile for driving it, such as an accelerator pedal, a brake pedal, a speed change lever and so on. And the motor controller 300 controls the battery controller 200 and the inverter 340 on the basis of speed control commands and braking/driving force control commands from the vehicle controller 400, and thereby controls the rotational speed and the torque of the motor 350 for driving the vehicle.

The battery controller 200 controls the charging and discharging of the battery BAT and also its SOC on the basis of the voltage, current, and temperature of the battery BAT as detected by a voltage sensor 210, a current sensor 220, and a temperature sensor 230, and also controls the cell controller 100 to manage the SOCs of the plurality of lithium ion cells that make up the battery BAT by performing variation correction of the SOCs so that no overcharged state occurs (hereinafter this will be termed "cell balancing" or "bypass current flow control").

It should be understood that while, with the embodiment of a control system for an assembled battery shown in FIG. 1, as an example, a battery BAT (an assembled battery) is shown in which a plurality of cell groups are connected in series, with each of these cell groups including four cells that are connected in series, a battery that is mounted to a hybrid automobile is generally a high voltage high capacity battery in which a greater number of cells are connected in series-parallel, and that maintains a voltage of several hundred volts between its terminals. Of course it is also possible to apply the present invention to such a high voltage high capacity battery.

The plurality of cells that make up the battery BAT are divided into groups each of which contains a predetermined number of cells, with a cell controller 100 being provided to each cell group. For example if, with a battery BAT in which 100 cells are connected in series, the cells are divided up into groups of 4 cells each, then 25 cell controllers 100 will be used. Each of these cell controllers 100 detects the voltage between the terminals of each of the cells that make up its cell group and transmits it to the battery controller 200, and performs bypass current flow control for each cell according to commands from the battery controller 200. Resistors R are resistors for limiting the bypass currents that bypass the cells, and one of these is provided for each of the cells.

It should be understood that, since the vehicle controller 400, the motor controller 300, the battery controller 200, and the motor 350 have no direct relationship with the bypass current flow control by the control system for an assembled battery according to the present invention, accordingly detailed explanation thereof will be omitted.

The DC electrical power that has been charged into the battery BAT is supplied via switches 301 and 320 to a smoothing capacitor 330 and to the inverter 340, and is converted by the inverter 340 into AC electrical power that is supplied to the AC motor 350, and thereby performs driving of the AC motor 350. On the other hand, during braking of the vehicle, AC electrical power that is generated by the AC motor 350 is converted into DC electrical power by the inverter 340, and is then smoothed by the smoothing capacitor 330 and supplied to the battery BAT via the switches 310 and 320, thus performing charging of the battery BAT.

Figure 2:
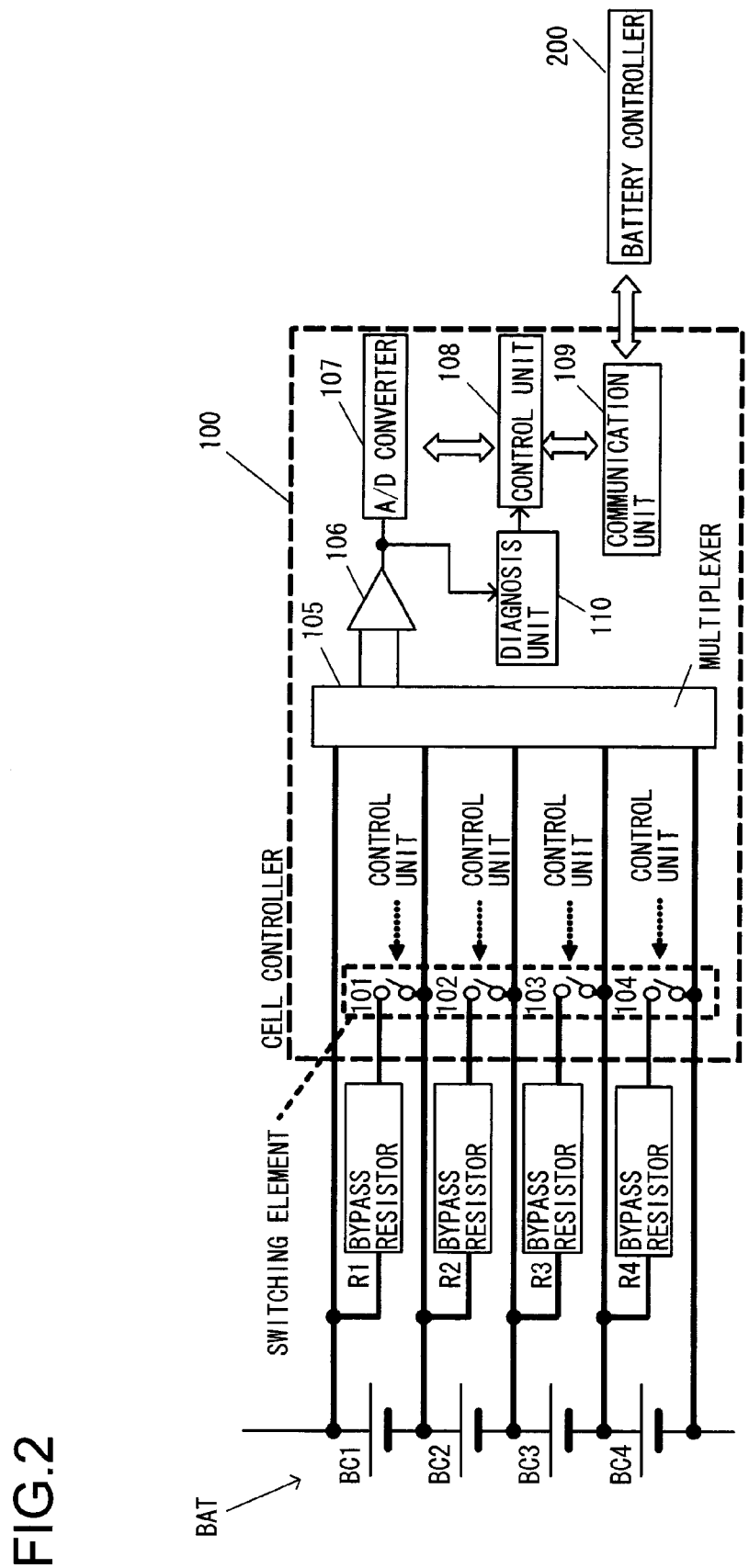
FIG. 2 is a figure showing details of a cell controller and bypass circuitry.

FIG. 2 shows details of the cell controller and the bypass circuitry. It should be understood that while, in this embodiment, an example is shown in which the four cells BC1, BC2, BC3, and BC4 constitute one cell group, and battery control is performed by one cell controller 100 for each of the cell groups, the number of cells that make up one cell group is not to be considered as being limited to 4. Furthermore, the cell controllers 100 that control the various cell groups all have the same circuit structure. The cell controller 100 includes switching elements 101 through 104, a multiplexer 105, a differential amplifier 106, an A/D converter 107, a control unit 108, a communication unit 109, a diagnosis unit 110, and so on, and is built as a single IC package (integrated circuit).

Bypass circuits are connected in parallel to each of the cells BC1 through BC4, including resistors R1 to R4 and the switching elements 101 to 104 connected in series, and when the switching elements 101 through 104 are closed, bypass currents flow in the resistors R1 through R4. Moreover, both ends of each of the cells BC1 through BC4 are connected to the multiplexer 105 of the cell controller 100, so that the multiplexer 105 changes over the cell whose voltage is detected. The output of the multiplexer 105 is connected to the differential amplifier 106 and the A/D converter 107, so that the voltage of each of the cells BC1 through BC4 is measured by the differential amplifier 106, and is converted into a digital value by the A/D converter 107.

The control unit 108 detects the voltages of the cells BC1 through BC4 by controlling the multiplexer 105 and the A/D converter 107, and outputs the results via the communication unit 109 to the battery controller 200, that is a higher level control system. And, on the basis of the measured cell voltages, the battery controller 200 determines the states of the cells, whether they are over-charged or over-discharged, and controls their charging and discharging. Moreover, on the basis of the results of measurement of cell voltages, the battery controller 200 transmits bypass conduction commands to the cell controller 100.

In concrete terms, the battery controller 200 transmits commands to the cell controller 100 to close the switching elements (101 through 104) for those ones of the cells (BC1 through BC4) whose voltages are high. And, upon receipt of these bypass conduction commands via the communication unit 109, the control unit 108 of the cell controller 100 closes the switching elements (101 through 104) that corresponds to the cells (BC1 through BC4) that are designated as requiring bypass conduction.

The time intervals over which the switching elements 101 through 104 for bypass conduction are to be closed may, for example, be determined by a method like the following. The voltages of all of the cells are measured in the no-load state when the system starts, all of these cell voltages are converted to SOCs, and the minimum of these SOCs is calculated. And the bypass discharge amounts required for bringing the cells into balance are determined according to the following Equation #1:

Bypass discharge amount for each cell=rated capacity×(SOC of that cell−minimum SOC)  (1)

Next, bypass discharge periods, in other words time intervals for closing the switching elements 101 through 104, are calculated on the basis of the bypass discharge amounts that have thus been calculated, as follows:

Bypass discharge period=bypass discharge amount/(rated voltage/resistance of bypass circuit)  (2)

As described above, a battery BAT in which a large number of cells, for example 100, are connected in series is used in an actual hybrid automobile. When these 100 cells are grouped four at a time, for example, and a cell controller 100 is connected to each of these cell groups, a requirement arises for 25 cell controllers, and these cell controllers 100 are connected to the battery controller 200. And, on the basis of these cell voltages, the battery controller 200 receives the voltages of all of the cells from all of the cell controllers 100, and determines overcharging or over-discharging and performs bypass current flow control for all of the cells.

Figure 3:
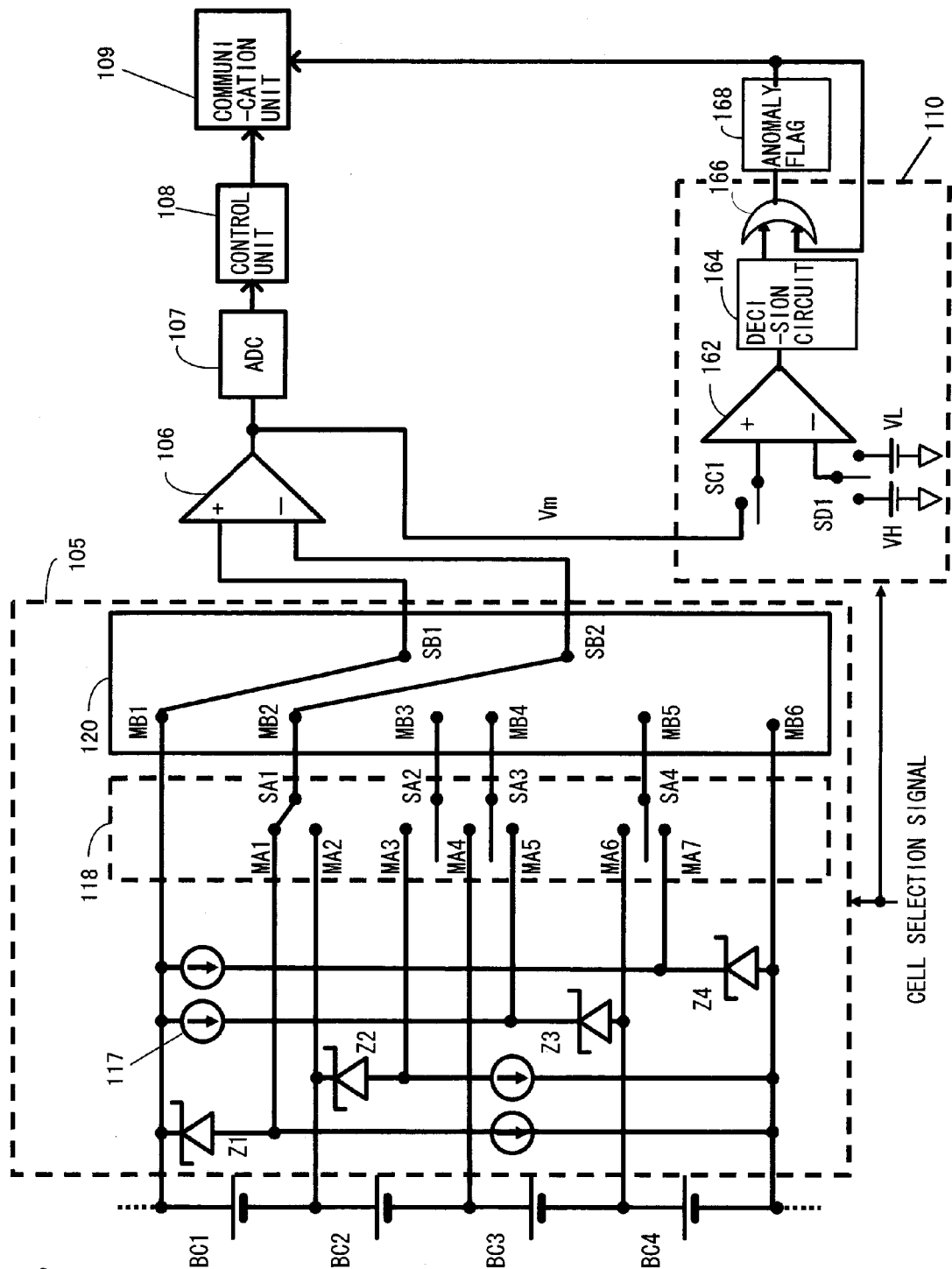
FIG. 3 is a circuit diagram showing details of the cell controller shown in FIG. 2.
Figure 4:
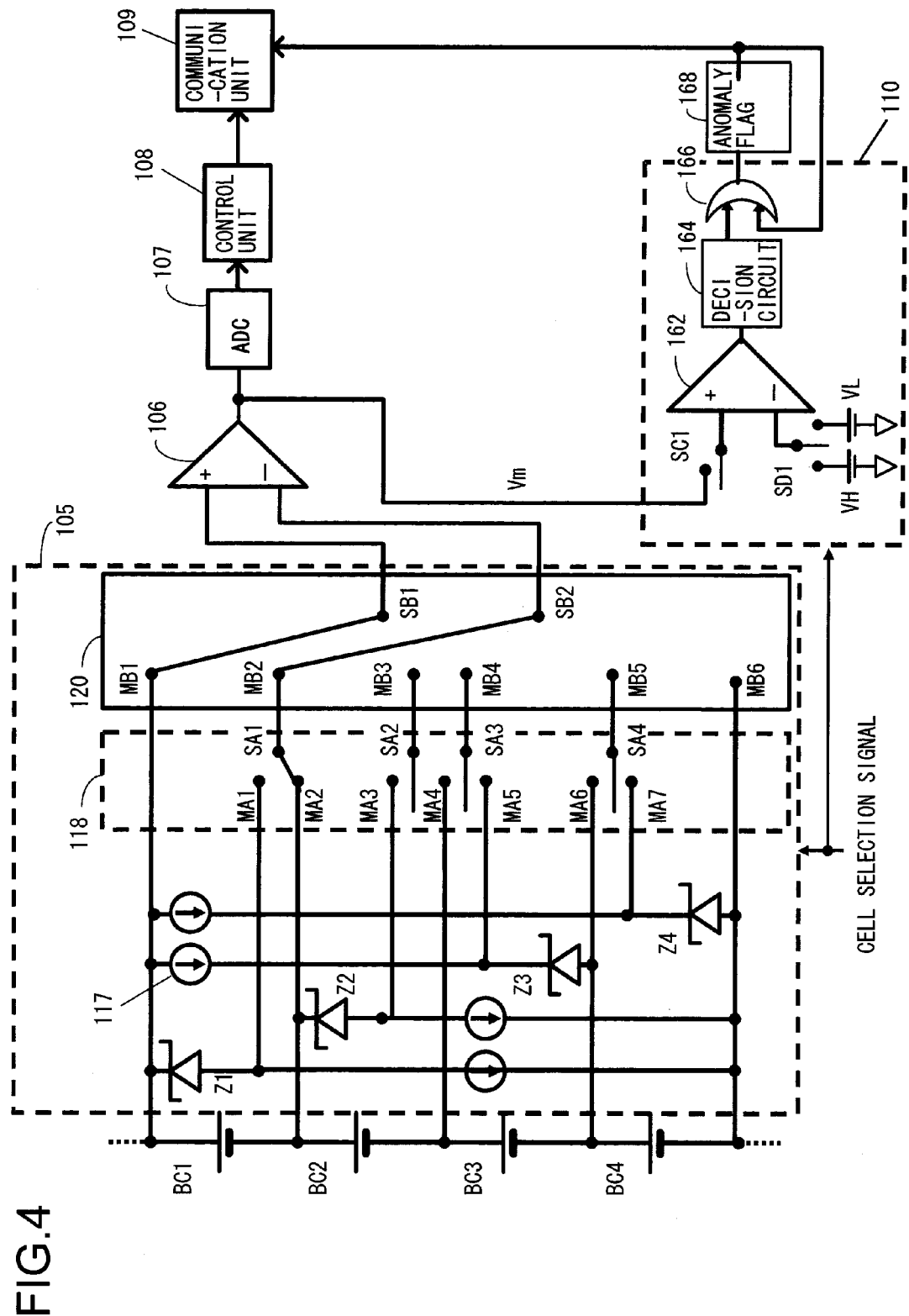
FIG. 4 is a circuit diagram showing details of the cell controller shown in FIG. 2.

The diagnosis unit 110 diagnoses whether or not the cell controller 100 is operating normally. The diagnosis operation by this diagnosis unit 110 will now be explained with reference to FIGS. 3 and 4. FIGS. 3 and 4 are circuit diagrams showing details of a cell controller 100 shown in FIG. 2. It should be understood that, in FIGS. 3 and 4, the switching elements 101 through 104 and the resistors R1 through R4 shown in FIG. 2 are omitted. Moreover, in this explanation, the same reference symbols are appended to elements that are the same as ones shown in FIGS. 1 and 2.

The diagnosis unit 110 diagnoses whether or not the multiplexer 105 of the cell controller 100 is operating normally. In FIGS. 3 and 4, the output of the differential amplifier 106 is connected to the input of the diagnosis unit 110. This diagnosis unit 110 includes a voltage comparison circuit 162, a decision circuit 164, an OR circuit 166, and voltage sources VH and VL and so on. On the other hand, the multiplexer 105 includes two switch circuits 118 and 120, constant voltage generation elements (Zener elements) Z1 through Z4, constant current circuits 117 that supply constant currents to each of these Zener elements, and so on. It should be understood that the Zener elements Z1 through Z4 correspond to the cells BC1 through BC4 respectively. A cell selection signal that is sent from the battery controller 200 via the communication unit 109 is inputted to the multiplexer 105 and to the diagnosis unit 110, and switches SA1 through SA4 of the multiplexer 105 and switches SC1 and SD1 of the diagnosis unit 110 are changed over according to this cell selection signal.

It should be understood that the Zener elements Z1 through Z4 are elements that are used for generating mutually different Zener voltages. For example: since Z1 corresponds to the cell BC1, it may generate around half of the voltage of four cells; since Z2 corresponds to the cell BC2, it may generate around half of the voltage of three cells; since Z3 corresponds to the cell BC3, it may generate around half of the voltage of two cells; and, since Z4 corresponds to the cell BC4, it may generate around half of the voltage of one cell. Each of the constant current circuits 117 for driving each of the Zener diodes is supplied with power from BAT (i.e. from the cells 1 through 4) as shown in FIG. 3, and, further they supply constant currents to each of the Zener elements. If these Zener elements have output voltage characteristics as described above, they can be sufficiently driven.

Each of the Zener elements Z1 through Z4 corresponds to and generates a different Zener voltage, and, while this feature is not shown in FIG. 3, there are also provided four groups of voltage sources VH, VL for checking that normal Zener voltages are being generated. The voltages Vh and Vl of these voltage sources VH and VL are set to be higher than the upper limit and lower than the lower limit of the characteristic voltage Vz of the corresponding Zener element, with the voltage ranges prescribed by Vh and Vl set for each of the Zener elements being set so as not to overlap.

Before performing voltage detection of each of the cells BC1 through BC4, in the diagnosis operation of the multiplexer 105, a decision is made as to whether or not the cell BC1 through BC4 that is to be the subject of voltage detection has been correctly selected. First, for the cell BC1, the battery controller 200 sends cell selection signals to the multiplexer 105 and the diagnosis unit 110 of the cell controller 100 for diagnosing the operation of selecting this cell BC1. As shown in FIG. 3, according to this cell selection signal, the multiplexer 105 switches the switch SA1 over to its contact point MA1 and thereby the two ends of the Zener element Z1 corresponding to the cell BC1 are connected to the + input and to the − input of the differential amplifier 106. Due to this, the Zener voltage Vz of the Zener element Z1 corresponding to the cell BC1 is inputted via the switch circuit 120 to the differential amplifier 106. And the differential amplifier 106 performs differential amplification upon this Zener voltage Vz, and outputs the result to the A/D converter 107 and to the diagnosis unit 110.

Along with closing the switch SC1 and connecting the output voltage (supposed to be Vm) of the differential amplifier 106 to the + input of the voltage comparison circuit 162, the diagnosis unit 110 connects the switch SD1 to the upper limit voltage source VH and thus connects the upper limit voltage Vh to the − input of the voltage comparison circuit 162. The upper limit voltage Vh of the upper limit voltage source VH is set to be higher than the rated upper limit value of the Zener voltage Vz. If Vm>Vh on the basis of the result of comparison by the voltage comparison circuit 162 of the output voltage Vm of the differential amplifier 106 and the upper limit voltage Vh, in other words if the output voltage Vm and the Zener voltage Vz of the Zener element that has been selected do not agree with one another, then the decision circuit 164 decides that the connection states of the switch circuits 118 and 120 of the multiplexer 105 are not correct, and outputs an anomaly signal.

Next, the diagnosis unit 110 connects the switch SD1 to the lower limit voltage source VL and thus connects the lower limit voltage Vl to the − input of the voltage comparison circuit 162. The lower limit voltage Vl of the lower limit voltage source VL is set to be lower than the rated lower limit value of the Zener voltage Vz. If Vm<Vl on the basis of the result of comparison by the voltage comparison circuit 162 of the output voltage Vm of the differential amplifier 106 and the lower limit voltage Vl, in other words if the output voltage Vm and the Zener voltage Vz of the Zener element that has been selected do not agree with one another, then the decision circuit 164 decides that the connection states of the switch circuits 118 and 120 of the multiplexer 105 are not correct, and outputs an anomaly signal.

Since the diagnosis unit 110 inputs the output voltage Vm of the differential amplifier 106 to the voltage comparison circuit 162 to perform diagnostics, accordingly it is capable of diagnosing not only an anomaly of the multiplexer 105, but also an anomaly of the differential amplifier 106. When an anomaly signal is inputted from the decision circuit 164, the OR circuit 166 of the diagnosis unit 110 outputs an anomaly signal to an anomaly flag storage circuit 168, and sets an anomaly flag in this anomaly flag storage circuit 168. When this anomaly flag is set, the anomaly flag storage circuit 168 outputs an anomaly signal to the OR circuit 166 and the communication unit 109. Due to this, when an anomaly flag is stored in the anomaly flag storage circuit 168, an anomaly signal is outputted from the OR circuit 166, even if a normal signal is outputted from the decision circuit 164.

The battery controller 200 recognizes an anomaly of the cell controller 100 on the basis of the cell selection signal transmitted to the cell controller 100 and the anomaly signal received from the cell controller. It should be understood that the anomaly flag that has been set in the anomaly flag storage circuit 168 may be reset by a command sent from the battery controller 200 via the communication unit 109.

When the operation of selection of the cell BC1 by the multiplexer 105 and the diagnosis of differential amplifier operation by the differential amplifier 106 have been completed, the battery controller 200 sends cell selection signals for performing voltage detection of the cell BC1 to the multiplexer 105 and the diagnosis unit 110 of the cell controller 100. As shown in FIG. 4, according to this cell selection signal, the multiplexer 105 switches the switch SA1 over to its contact point MA2, and thereby the two ends of the cell BC1 are connected to the + input and to the − input of the differential amplifier 106. On the other hand, the diagnosis unit 110 opens the switches SC1 and SD1 according to the cell selection signal for voltage detection, and stops the diagnosis operation.

It should be understood that, after the selection operation diagnosis and the voltage detection described above for the cell BC1 have been completed, then similar procedures of selection operation diagnosis and voltage detection are executed for the other cells BC2 through BC4 in sequence, in an analogous way.

Characteristics of a Lithium Ion battery

Next, the characteristics of a lithium ion battery will be explained. While there are various factors that can cause a variation between the SOCs of the cells, such as a variation between the speeds of self-discharge of the cells, a variation between their charging and discharging efficiencies of the cells, a variation between the currents consumed during operation of their control circuits, a variation between the dark currents of their control circuits while stopped, and so on, with a battery that is mounted in a passenger car, the variation due to self-discharge (i.e. of natural discharge) are relatively dominant, since often periods of disuse are long. In the case of a lithium ion battery, the no-load voltages of the cells are measured when the system starts, and bypass currents are flowed through cells for which these no-load voltages are high, thus reducing their SOCs.

With a lithium ion cell it is not possible to reduce variations of SOC by overcharging, since in the overcharged state there is no reaction for absorbing oxygen generated at the negative electrode, as with a nickel-hydrogen battery or a nickel-cadmium battery. Accordingly the function of bypass current conduction is very important for a lithium ion battery, and, since variations of the SOCs are engendered if there is no bypass current conduction function, when the battery (the assembled battery) is used, some cells will become cells whose SOCs are high and some will become cells whose SOCs are low, and this is undesirable. When, with this type of battery, charging and discharging are controlled on the basis of the total voltage or on the basis of the average SOC of all of the cells, and thus there is a possibility that, during charging and discharging, those cells whose SOCs are low may get into an over-discharged state, and/or those cells whose SOCs are high may get into an overcharged state.

With a lithium ion cell, when charging is performed in the state in which the SOC is become low so that it has become over-discharged, there is a possibility that the copper of the negative electrode collector may be eluted out, and that this copper may be deposited as dendrites and may cause short circuiting between the positive electrode and the negative electrode. Due to this, appropriate charging is performed so that the cells do not get into the over-discharged state. Furthermore, when a lithium ion cell gets into the overcharged state, reactions such as decomposition of the electrolyte and decomposition of the positive electrode active material and negative electrode active material may take place, and not only are these reactions irreversible ones, but also the temperature within the cell and its internal pressure become elevated. In order to avoid this type of overcharged state, with a lithium ion cell, a construction is adopted in which a gas release vent valve is provided to the cell, so that any internal pressure can escape in a safe manner.

Since, with a battery in which a large number of cells are connected in series-parallel, along with detecting the total voltage of the battery with a total voltage detection circuit, also the voltages of all of the cells are detected with cell voltage detection circuits and charging and discharging control of the battery is performed according to those detected values, accordingly the possibility is low that the battery as a whole will become overcharged or over-discharged. However, if a fault occurs in one of the cell voltage detection circuits, there is a possibility that the cell at the site of the fault may become overcharged, since the bypass current conduction function for that cell is not operated normally. For example, if it is supposed that a fault has arisen with one of the cell voltage detection circuits and the voltage of some cell is erroneously detected as being low, then, since a low voltage is detected even if the actual no-load voltage of that cell is not low, this cell will become eliminated as a subject for the conduction of bypass current, while the other cells will become subjects for the conduction of bypass currents. Due to this, after the flows of bypass current have ended, the SOCs only of the other cells will become low by amounts corresponding to those flows of bypass current, i.e., conversely, the SOC of that cell will become relatively high by that amount. When this operation is repeated, while the total voltage will remain normal in appearance, actually that cell (only) will be put into an overcharged state.

In order to prevent the overcharged state from accompanying this type of fault in a cell voltage detection circuit, as described above, with a prior art control system for an assembled battery, it has been arranged to duplicate all of the cell voltage detection circuitry, so that, even if a fault occurs in one of the voltage detection circuits, it is still possible reliably to detect the voltage of the corresponding cell with its other voltage detection circuit. For example, in the example of FIG. 2, it is arranged to provide another set of the circuitry after the multiplexer, so that it is also possible to input the various cell voltages to this second circuitry set and detect them therewith. This type of additionally provided voltage detection circuit is termed a redundant voltage detection circuit system.

Example of Behavior of a Lithium Ion Cell when Overcharged

Next, an example of the behavior of a lithium ion cell in the overcharged state will be explained. Generally the cell voltage rises along with charging even during overcharging, and the pressure within the cell rises and the gas release vent operates so that gas is emitted. For example, with a lithium ion cell employed with the control system for an assembled battery according to the present invention, there is a possibility that the gas release vent valve may operate at 230% SOC or more, and accordingly with this cell the gas release vent valve operational region is taken as being SOC 230% and above. The threshold value of SOC at which the gas release vent valve operates depends largely upon the characteristics of the lithium ion cell, and varies according to various conditions such as the nature of the positive electrode active material, the nature of the negative electrode active material, the composition of the electrolyte, and so on. This gas release vent valve operational region of SOC 230% or more is only given as an example.

However, the characteristic of the cell voltage rising and the gas release vent valve operational region being approached when the SOC becomes high is a common characteristic to all lithium ion cells, and due to this, with a control system for an assembled battery according to the prior art, the cell voltage that is taken as being overcharge is set at some cell voltage between the cell voltage at a SOC of 100% and the cell voltage of at which the SOC of the lower limit of the gas release vent valve operational region, and the detection voltage of the overcharging detection circuit of the redundant system is also set to a value of cell voltage within the above described range of SOC.

Figure 5:
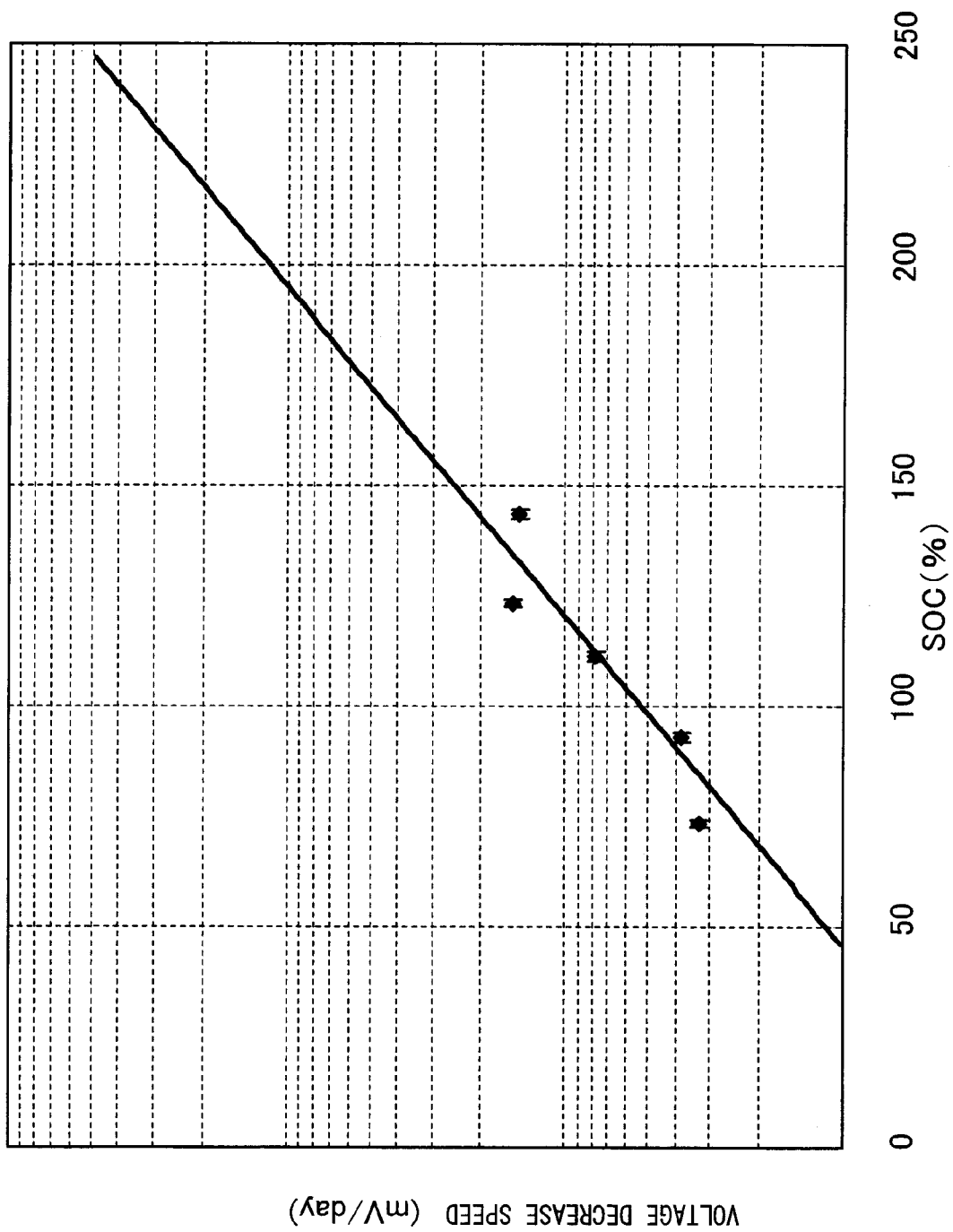
FIG. 5 is a figure showing an example of the SOC and voltage decrease speed characteristics of a lithium ion battery.

Self-Discharge of Lithium Ion Cell, and the Self-Discharge Current-Converted Value The relationship between self-discharge of a lithium ion cell and its SOC will now be explained. Generally, the higher the SOC of a cell is, the greater its self-discharge becomes. The meaning of self-discharge becoming greater is that the rate of voltage decrease during disuse becomes greater. An example of the relationship between the SOC of a lithium ion cell and its voltage decrease speed is shown in FIG. 5. This figure is a plot of the SOC of a lithium ion cell at the temperature of 25° C. against its voltage decrease speed (mV/day). As is clear from FIG. 5, the higher the SOC is, the greater does the voltage decrease speed become. This fact means that when the cell is being charged with some voltage, the more the SOC rises as charging proceeds, the greater is the rate of decrease of SOC due to self-discharge, and accordingly the effective current by which the cell is being charged becomes smaller.

Figure 6:
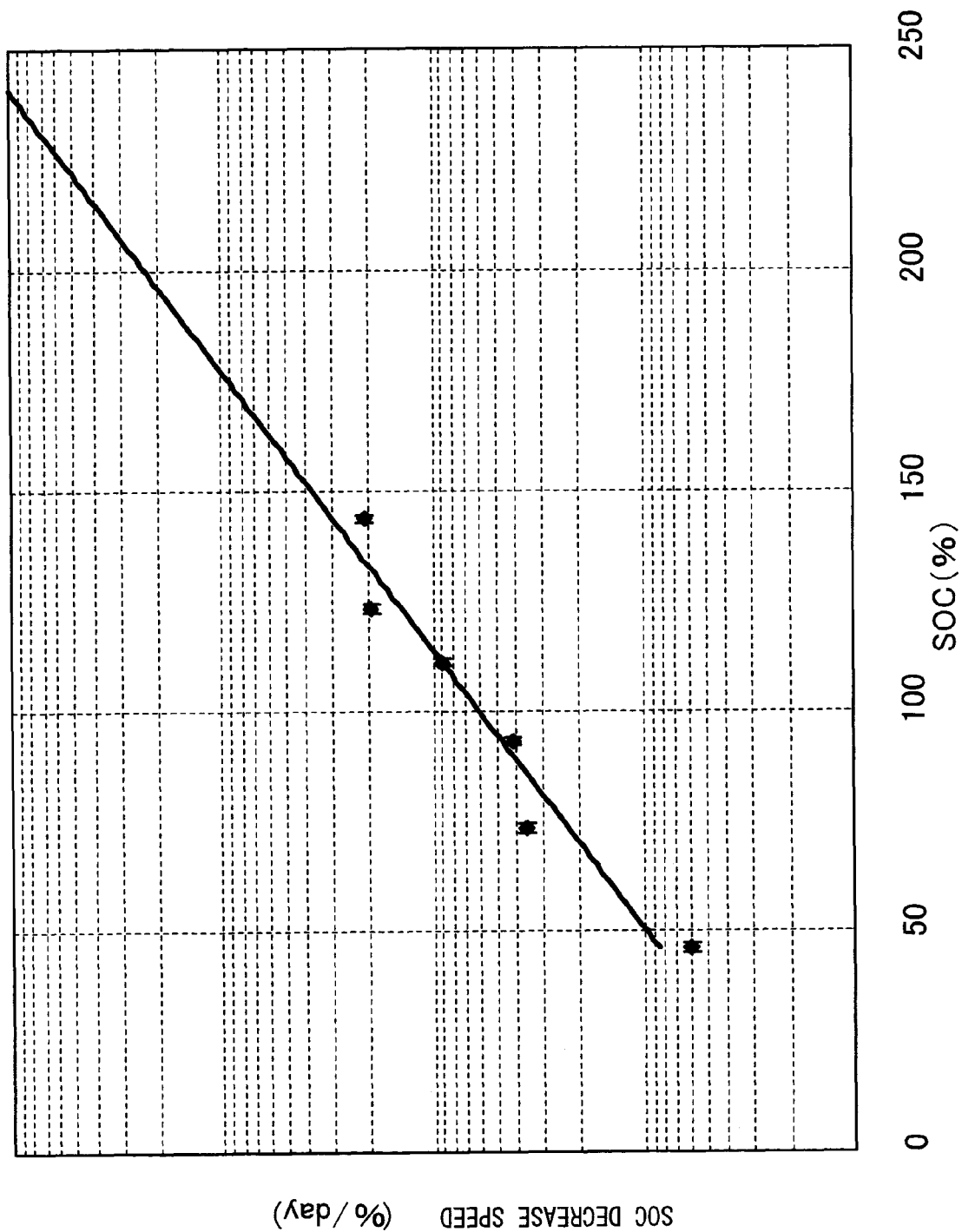
FIG. 6 is a characteristic figure in which the voltage decrease speed shown in FIG. 5 has been converted into SOC decrease speed.

FIG. 6 is a characteristic figure in which the voltage decrease speed shown in FIG. 5 has been converted into the corresponding SOC decrease speed. As is clear from this characteristic figure, the higher is the SOC, the greater is the SOC decrease speed. Here, since the SOC decrease speed is the speed of decrease of remaining capacity, the reduction in SOC that accompanies self-discharge may be converted into discharge current of the cell with the following Equation #3:

$$\text{self-discharge current-converted value (mA)} = \text{rated capacity (mAh)} \times \text{SOC decrease speed (\%/hour)}/100 \quad (3)$$

Figure 7:
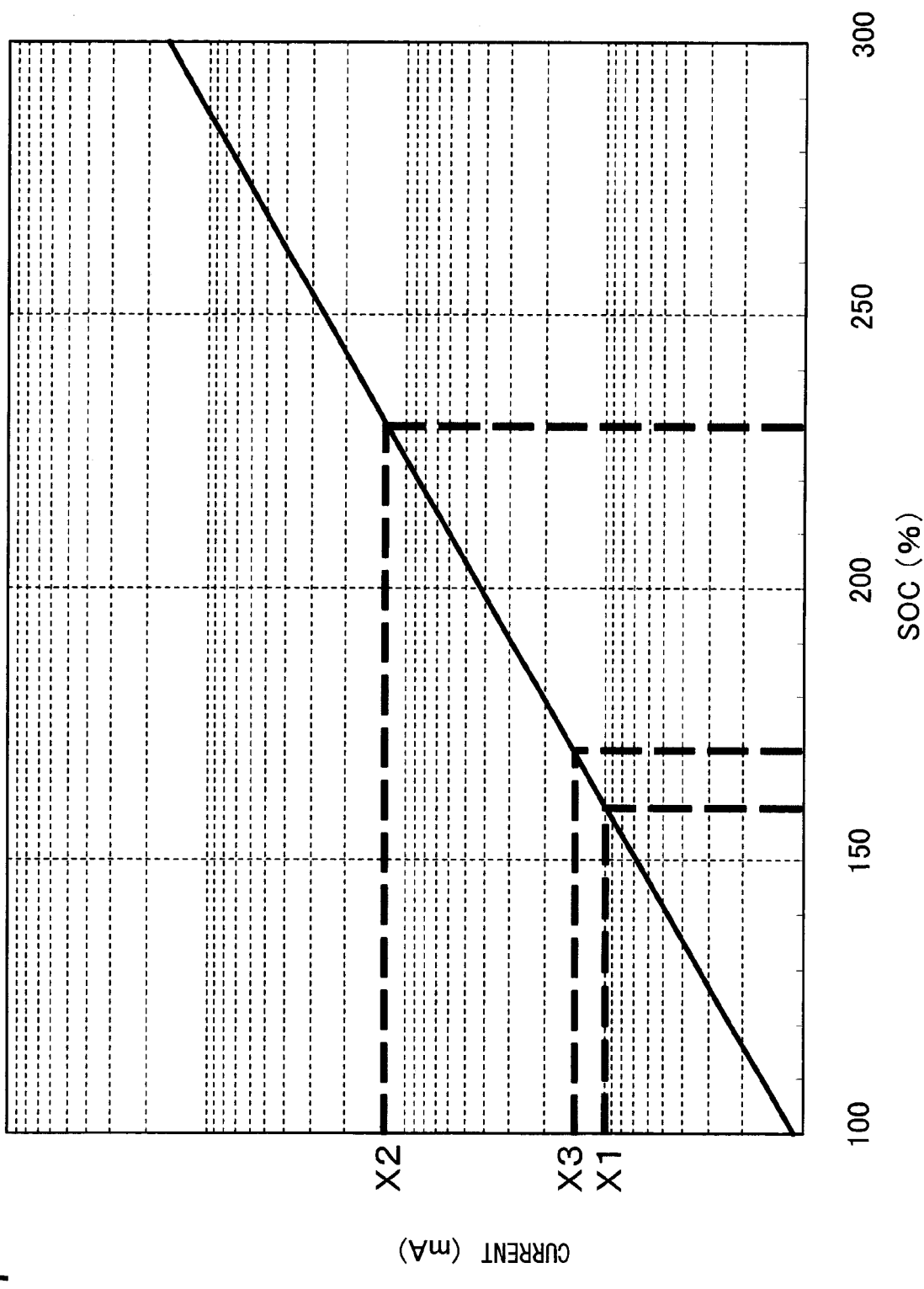
FIG. 7 is a figure showing a relationship of the self-discharge current-converted value of a lithium ion battery with respect to its SOC.

When the relationship between the current-converted value of self-discharge and the SOC is plotted from the approximate curve of the characteristic example of FIG. 6, a relationship of the current-converted value of self-discharge to the SOC of the lithium ion cell such as that shown in FIG. 7 is obtained.

As shown in FIG. 7, the higher is the SOC, the greater the current-converted value of self-discharge becomes. In this specification, the physical quantity obtained by converting the decrease of SOC that accompanies self-discharge of the cell into discharge current of the cell is termed the "self-discharge current".

The Maximum SOC During Overcharging and the Bypass Current Set Value

From the relationship explained above between the SOC and the self-discharge current of a lithium ion cell, if a lithium ion cell is overcharged at a constant current, only that part of the current that remains after subtracting the self-discharge current from the charging current will be effective for charging the cell. Since the self-discharge current increases as the SOC becomes higher, when the SOC becomes yet higher, the self-discharge current increases and eventually becomes equal to the charging current, and the charging of the cell is no longer performed subsequently to that time point, even if the charging current continues to flow. This type of characteristic is not limited to the case of a lithium ion cell; it is a common characteristic of all cells that exhibit similar charging characteristics.

Let us suppose that, in FIG. 2, for example, a malfunction has occurred with the voltage detection function of the cell BC2, and that a no-load voltage has been detected that is lower than the actual one. First, the SOCs of all of the cells BC1 through BC4 are calculated on the basis of the no-load voltages of those cells, including the no-load voltage of this cell BC2, and bypass conduction is executed for those cells whose SOCs are high. It should be understood that, in this case, the no-load voltage that is detected for the cell BC2 is not a low voltage such as caused by over-discharge, but either is a voltage in the normal range or is a lower voltage value than those of the other cells. Since a lower value for the voltage of the cell BC2 is detected due to the malfunction described above, and since the estimated SOC value that corresponds thereof becomes lower, accordingly the switching elements 101, 103, and 104 for the other cells BC1, BC3, and BC4, with the exception of this cell BC2, are closed, and bypass conduction is started. At this time, no bypass current flows in the cell BC2, and discharge thereof is not performed. Adjustment of the conduction time interval of this bypass conduction for each of the cells is performed so that the SOCs of the cells BC1, BC3, and BC4 attain approximately the same level as the detected SOC of the cell BC2. Since charging for all of the cells is performed, for example, with the target being that the SOC of all of the cells should become 100% simultaneously, accordingly the SOC of the cell BC2 increases more and more, and it gets into an overcharged state.

Since the detected SOC of the cell BC2 remains low, the charging of all of the cells when bypass conduction is performed for the cells BC1, BC3, and BC4 is performed until the value of the SOC detected for the cell BC2 is 100%, while no bypass conduction is performed for the cell BC2, and, since only charging is performed for this cell BC2, its SOC goes over 100% and it gets into an overcharged state.

Thus, for example, suppose that the cell BC2 is actually in an overcharged state (SOC), and that bypass conduction is performed for the cells other than the cell BC2 with bypass currents that are the same as the self-discharge current in this state. Since no bypass conduction is being performed for the cell BC2, its SOC decreases by a value just equal to the self-discharge current×the bypass conduction time interval. Moreover, for the cells BC1, BC3, and BC4 as well, the SOC decreases by a value just equal to the self-discharge current× the bypass conduction time interval. Accordingly, the difference between the SOC of the cell BC2 (its SOC in the overcharged state) and the SOCs of the cells BC1, BC3, and BC4 does not change. It should be understood that in this explanation, for ease of understanding, it is supposed that the time interval over which the bypass currents flow is relatively short, and that during this interval the magnitude of the self-discharge current remains constant.

The measurement of the no-load voltages of the cells and the calculation of the SOCs based thereupon is, for example, performed when this electrically operated vehicle is started, and bypass discharge is performed only for the cells other than the cell BC2.

As previously described, the further a cell gets into the overcharged state, the more its self-discharge current increases. In the example described above, suppose that, conversely, the cell BC2 is not yet in the overcharged state, and suppose that the magnitudes of the bypass currents are set to magnitudes that are the same as the self-discharge current in some overcharged state of a lithium ion battery cell.

In this state, since the self-discharge current of the cell BC2 is smaller than its self-discharge current in the overcharged state, accordingly, although the SOCs of the other cells BC2, BC3, and BC4 decrease due to bypass conduction, the reduction in the SOC of the cell BC2 is relatively small, since the self-discharge current of that cell BC2 is smaller than the bypass currents.

As described above, when the no-load voltages of the cells are measured and their SOCs are calculated on the basis thereof, and when bypass discharge based thereupon and charging of all the cells is repeatedly performed, then the SOC of the cell BC2 gradually increases.

When in this state the overcharging of the cell BC2 is continued for a long period of time the self-discharge current increases along with increase of the SOC of this cell BC2, and eventually the self-discharge current of the cell BC2 and the bypass currents of the cells other than the cell BC2 become equal to one another. And even though, from this time point, a charging current that is equivalent to the bypass currents of the cells other than the cell BC2 continues to flow to the cell BC2, the self-discharge current of the cell BC2 is greater than the bypass currents of the other cells BC1, BC3, and BC4, and so, from the explanation given above, the SOC of the cell BC2 does not increase beyond this level. In other words, even though a fault has occurred with the voltage detection function for the cell BC2, and even though no bypass conduction is performed for that cell, and even though charging with the charging current is continued, the charging of the cell BC2 only progresses up to the SOC at which a self-discharge current flows that is equal to the bypass currents for the cells other than this cell BC2, and overcharging beyond this level is automatically prevented.

If the bypass current is put equal to the self-discharge current X1 (mA) in FIG. 7 that shows the characteristic of the self-discharge current with respect to SOC, then overcharging only proceeds as far as the SOC of 160% that corresponds to the self-discharge current X1. To put it in another manner, if charging beyond a SOC of 160% is to be prevented, then the bypass currents may be limited to X1. Since the bypass currents may be determined according to the cell voltages and the resistances in the bypass circuits, accordingly the resistances of the bypass circuits may be obtained from the cell voltage that corresponds to the SOC of 160% as obtained from the characteristic of cell voltage with respect to SOC, and from the bypass current X1 that corresponds to the SOC of 160% obtained from FIG. 7, according to the following Equation #4:

Resistance of bypass circuit (Ω)=cell voltage/bypass current (4)

As described above, with a prior art control system for an assembled battery, the detection system for detecting the cell voltages is provided as a dual system in order to enhance the reliability, and this entails the problems that the system becomes complicated due to increase in the number of components, and that the cost becomes high. However, with the control system for an assembled battery according to this embodiment of the present invention, since the currents that flow in the bypass circuits are made to be equal to the self-discharge current when a cell is in some overcharged state, accordingly, even though the state continues in which a fault is occurring with a voltage detection circuit that detects the voltage of some one of the cells that make up this assembled battery and thus a smaller no-load voltage comes to be detected for this cell than for the other cells, so that no bypass current flows in this cell, still it is possible to prevent this cell from getting into a more overcharged state than the overcharged state corresponding to the above described self-discharge current. Due to this, it is possible to manage with a single system for the voltage detection circuit of the cell controller 100, as shown in FIG. 2, and thus it is possible to simplify this control system for an assembled battery and to reduce the cost thereof.

Moreover, with the lithium ion cell described above, the gas release vent valve operates in the region in which some predetermined SOC is exceeded. In the example previously described, the gas release vent valve operational region was taken as being that of SOC 230% or greater. Accordingly, if the maximum SOC at which further overcharging is stopped is set to 230%, then, with this lithium ion cell, it is possible to prevent operation of the gas release vent valve due to overcharging. Since, in FIG. 7, the self-discharge current that corresponds to a SOC of 230% is X2 (mA), accordingly it will be sufficient to set the resistances of the bypass circuits according to Equation #4 so that the bypass currents become equal to X2.

Furthermore, it is desirable to make the maximum SOC for which the bypass current is set be a value that is smaller than the value obtained by subtracting the SOC control width used by this battery (i.e. by this assembled battery) from the threshold value of SOC (230% in the example shown in FIG. 7) for operation of the gas release vent valve of the cell. If charging and discharging as a battery is performed, then the SOCs of the cells come to fluctuate by the amounts of SOC by which the battery is charged and discharged. Accordingly, if the maximum SOC for which the bypass currents are set is made to be lower by the SOC control width during battery charging and discharging, then, even if charging and discharging of the battery is performed, the SOCs of the cells remain less than or equal to this maximum SOC, and thus it is possible further to enhance the security.

With the hybrid automobile in the first embodiment shown in FIG. 1, the charging and discharging of the battery BAT are controlled on the basis of the values detected by the voltage sensor 210, the current sensor 220, and the temperature sensor 230, so as to keep the SOC of the battery BAT between, for example, 20% to 80%. In this case, since the control width for the SOC is 60%, if the maximum SOC at which the bypass current is set is taken as being 170%, that is the value obtained by subtracting the SOC control width of 60% from the SOC of 230% that is the threshold value at which the gas release vent valve operates, then it is ensured that, even if charging and discharging of the battery BAT is performed with the SOC control width of 60%, the SOC of 230% at which the gas release vent valve of the cell operates is not reached, so that it is possible further to enhance the security as a battery for a hybrid automobile. In the example shown in FIG. 7, it will be appropriate to set the resistances of the bypass circuits according to Equation #4 described above so that the bypass currents become equal to the value of self-discharge current X3 (mA) that corresponds to a SOC of 170%.

In FIG. 2, normally, MOSFETs or the like are used for the switching elements 101 through 104, and these switching elements 101 through 104 conduct the bypass currents by being turned ON and OFF by duty ratio control. When the bypass flows are provided by turning the switching elements 101 through 104 ON and OFF in this manner, the average currents become equal to the bypass currents described above. Moreover, by performing duty control of the switching elements 101 through 104 in this manner, it is possible to make the bypass currents be variable. By providing the bypass conduction by turning the switching elements 101 through 104 ON and OFF by duty control, it is also possible to control the heat generated by the resistors R1 through R4 of the bypass circuits. It should be understood that, when the switching elements 101 through 104 are controlled by duty control to control the bypass currents, it is necessary to set the resistance values of the resistors R1 through R4 of the bypass circuits higher than according to Equation #4 described above, in correspondence with the duty ratio.

Furthermore, since generally the self-discharge of a cell has the characteristic of becoming greater the higher is the temperature and becoming smaller the lower is the temperature, accordingly the bypass currents may be adjusted according to the temperature of the battery BAT as detected by the temperature sensor 230 shown in FIG. 2. In concrete terms, the higher the temperature of the battery BAT is, the greater should the bypass currents be set. It should be understood that, in this case, it will be appropriate to vary the bypass currents according to the battery temperature by performing duty control of the switching elements 101 through 104 as described above.

As has been explained above, with a control system for an assembled battery according to the prior art, if a fault has occurred with the voltage detection circuit of one of the cells, so that a low voltage between the terminals of that cell is detected irrespective of the fact that the cell is in an overcharged state, then that cell will continue to be charged and will become overcharged; and if the magnitudes of the bypass currents for discharging the cells are not set appropriately, then there is a possibility that the overcharging of that cell may even progress as far as the level at which the gas release vent valve operates. In a control system for an assembled battery according to the prior art, as a countermeasure for fault of the voltage detection circuits, the voltage detection circuits for all of the cells are made as duplicated, and thereby it is ensured that, even if there is a fault in one of these voltage detection circuits, still it is possible reliably to detect the voltage of the corresponding cell with its other duplicate voltage detection circuit. Thus, with the control system for an assembled battery according to the present invention, it is possible to set the bypass currents so that overcharging does not progress beyond a predetermined overcharged state, and it is possible to avoid the occurrence of various types of malfunction along with overcharging. Due to this, even if only one system is provided for detecting the voltages of the cells, it is still possible to implement a safe assembled battery for which malfunctioning of the cells does not occur. Moreover, since it is possible to provide only one system for detecting the voltages of the cells, accordingly it is also possible to implement reduction of the cost.

Variants of this Embodiment

Figure 8:
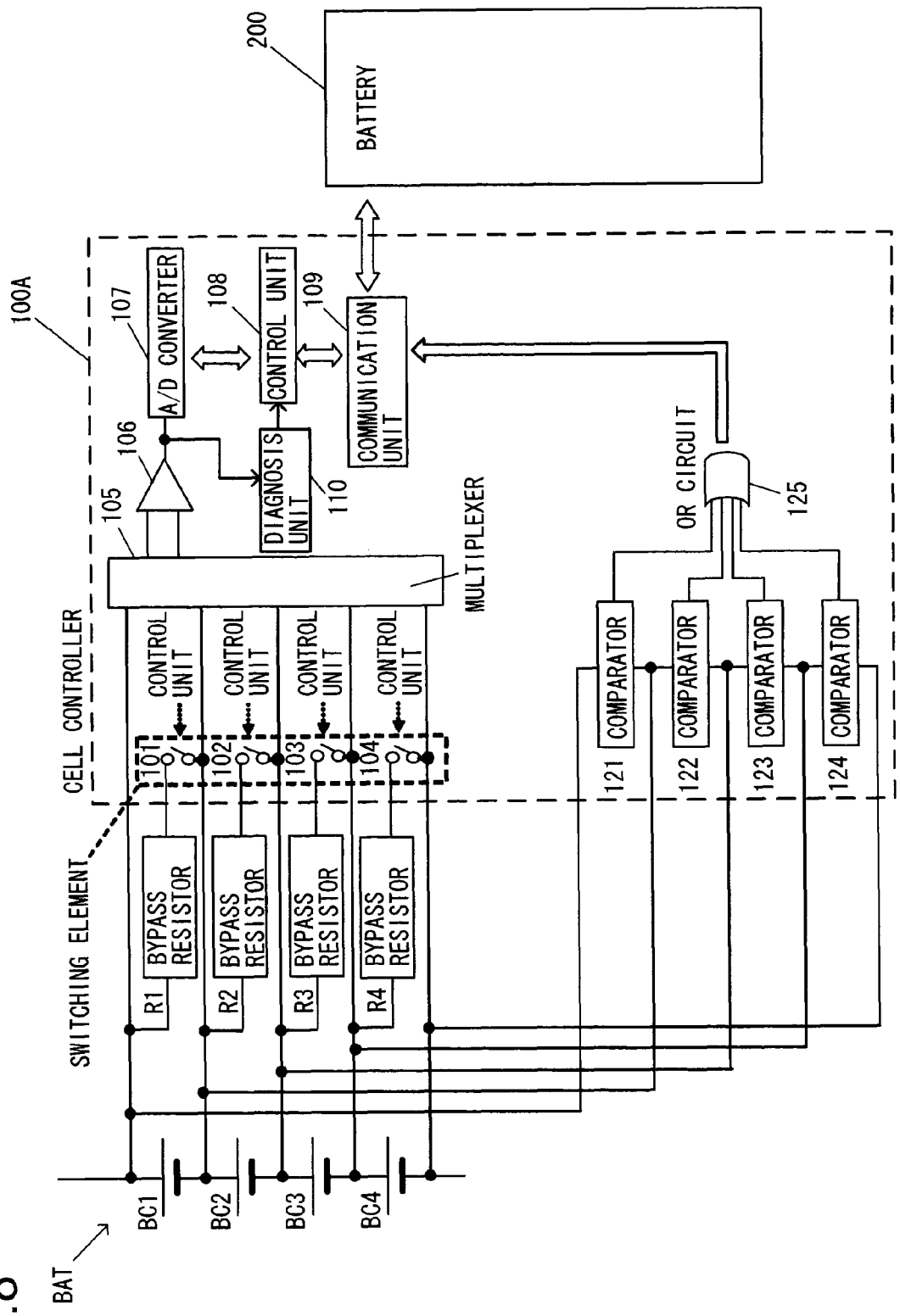
FIG. 8 is a figure showing the structure of a cell controller in which an overcharging detection circuit has been added to the cell controller shown in FIG. 2.

While, with the embodiment described above, an example of a control system for an assembled battery that uses a single voltage detection circuit system has been cited and explained, it would of course also be possible to apply the present invention to a control system for an assembled battery that is provided with a dual voltage detection circuit system. FIG. 8 shows the structure of a cell controller 100A in which an overcharging detection circuit has been added to the cell controller 100 shown in FIG. 2. It should be understood that, in this FIG. 8, the same reference symbols are appended to the same elements of the control system for an assembled battery of the first embodiment as in FIGS. 1 and 2, and this explanation will focus upon the points of difference.

This cell controller 100A is one that results from adding, to the cell controller 100 shown in FIG. 2, an overcharging detection circuit that includes comparators 121 through 124 and an OR circuit 125. Each of the comparators 121 through 124 compares the voltage between the terminals of its corresponding cell BC1 through BC4 with an overcharging decision reference voltage, and outputs an overcharging signal to the OR circuit 125 when the cell voltage exceeds the overcharging decision reference voltage. When the voltage of any one of the cells BC1 through BC4 exceeds the overcharging decision reference voltage, and an overcharging signal is sent from the corresponding one of the comparators 121 through 124, the OR circuit 125 transmits cell overcharging information for the battery BAT to the battery controller 200 via the communication unit 109.

It should be understood that the terminal potentials of the positive and negative electrodes of each of the cells BC1 through BC4 are supplied to the comparators 121 through 124, these terminal potentials of the positive and negative electrodes are converted by differential amplifier circuits into the voltages between terminals, and these voltages between terminals are compared with the overcharging decision reference voltage by the comparators. The comparators shown in FIG. 2 are actually devices that include differential amplifier circuits and comparators, and here are shown in simplified form.

When the battery controller 200 has received overcharging information for a cell from the cell controller 100A, it stops the charging and discharging of the battery BAT irrespective of the cell voltages as detected by the voltage detection circuits of the embodiment described above that include the multiplexers 105, the differential amplifiers 106, and the A/D converters 107. Accordingly, since it is possible to detect an overcharged state of the cells BC1 through BC4 with the overcharging detection circuit that includes the comparators 121 through 124 and the OR circuit 125 even if a fault has occurred in the voltage detection circuit shown in FIG. 2, accordingly it is possible reliably to stop the charging and discharging of the battery BAT and thereby to prevent further overcharging of the cells BC1 through BC4. Even further, since the resistors R1 through R4 of the bypass circuits are able to prevent overcharging over the desired maximum SOC by limiting the bypass currents, as explained in connection with the first embodiment, accordingly the overcharging prevention circuit for the cells BC1 through BC4 becomes, overall, a triplicated circuit, and thus it is possible to provided a control system for an assembled battery whose reliability is extremely high.

While various embodiments and variant embodiments have been explained in the above disclosure, the present invention is not to be considered as being limited by the details of those embodiments. Other modes of application that are considered to fall within the range of the technical concept of the present invention are also included within the scope of the present invention.

What is claimed is:

1. A control system for an assembled battery that controls an assembled battery comprising a plurality of cells, comprising:
- a bypass circuit connected in parallel to each cell of the plurality of cells, and comprising a switching element and a resistor connected in series; and
- a control circuit that controls a bypass current flowing in the bypass circuit by opening and closing the switching element, in order to discharge the cell;
- wherein the bypass circuit is set so that a current equal to or less than a natural self-discharge current of the cell in a predetermined overcharged state of the cell flows in the bypass circuit;
- wherein the self-discharge current of the cell is calculated based on a rated capacity of the cell and on a rate of change in a State Of Charge (SOC) of the cell due to self-discharge; and
- wherein the self-discharge current of the cell is calculated based on the rate of change in the SOC of the cell at a SOC value that is obtained by subtracting a SOC control width of the assembled battery from a value of the SOC of the cell in the predetermined overcharged state at which a gas release vent valve of the cell operates.

2. A control system for an assembled battery according to claim 1, wherein the self-discharge current of the cell is calculated based on the rate of change in the SOC of the cell at a SOC value lower than a value of the SOC of the cell in the predetermined overcharged state at which a gas release vent valve of the cell operates.

3. A control system for an assembled battery according to claim 1, wherein the control circuit performs duty control of the switching element so that the bypass current intermittently flows in the bypass circuit, and so that an averaged current of the bypass current that flows intermittently in the bypass circuit and the self-discharge current of the cell agree with one another.

4. A control system for an assembled battery according to claim 3, further comprising a detector that detects a temperature of the assembled battery, and wherein the control circuit adjusts the averaged current of the bypass current flowing intermittently in the bypass circuit according to the temperature detected by the detector.

5. A control system for an assembled battery according to claim 1, wherein the control circuit performs duty control of the switching element so that the bypass current intermittently flows in the bypass circuit, and so that an averaged current of the bypass current that flows intermittently in the bypass circuit and the self-discharge current of the cell agree with one another.

6. A control system for an assembled battery according to claim 2, wherein the control circuit performs duty control of the switching element so that the bypass current intermittently flows in the bypass circuit, and so that an averaged current of the bypass current that flows intermittently in the bypass circuit and the self-discharge current of the cell agree with one another.

7. A control system for an assembled battery according to claim 1, wherein the control circuit performs duty control of the switching element so that the bypass current intermittently flows in the bypass circuit, and so that an averaged current of the bypass current that flows intermittently in the bypass circuit and the self-discharge current of the cell agree with one another.

* * * * *